United States Patent
Joo (10) Patent No.: US 8,913,563 B2
(45) Date of Patent: Dec. 16, 2014

(54) VELOCITY BASED RANDOM ACCESS SCHEME

(75) Inventor: Jung Suk Joo, Yongin-Si (KR)

(73) Assignee: Empire Technology Development LLC, Wilmington, DE (US)

( * ) Notice: Subject to any disclaimer, the term of this patent is extended or adjusted under 35 U.S.C. 154(b) by 561 days.

(21) Appl. No.: 12/366,800

(22) Filed: Feb. 6, 2009

(65) Prior Publication Data

US 2010/0202367 A1    Aug. 12, 2010

(51) Int. Cl.
*H04W 72/00* (2009.01)
*H04W 72/12* (2009.01)
*H04W 64/00* (2009.01)
*H04W 74/00* (2009.01)

(52) U.S. Cl.
CPC .......... *H04W 72/121* (2013.01); *H04W 64/006* (2013.01); *H04W 72/00* (2013.01); *H04W 74/006* (2013.01)
USPC ........................................................ 370/329

(58) Field of Classification Search
CPC ... H04W 36/32; H04W 64/006; H04W 4/027; H04W 72/00; H04W 72/121; H04W 74/006
USPC ......... 370/241, 252, 310, 328, 329, 335, 336; 455/403, 422.1, 435.1, 435.2, 435.3
See application file for complete search history.

(56) References Cited

U.S. PATENT DOCUMENTS

| | | | | |
|---|---|---|---|---|
| 5,436,904 A | * | 7/1995 | Pequet et al. | 370/347 |
| 5,507,008 A | * | 4/1996 | Kanai et al. | 455/512 |
| 6,256,500 B1 | * | 7/2001 | Yamashita | 455/441 |
| 6,392,595 B1 | * | 5/2002 | Katz et al. | 342/367 |
| 6,438,375 B1 | * | 8/2002 | Muller | 455/435.3 |
| 6,621,803 B2 | * | 9/2003 | Halton et al. | 370/329 |
| 6,697,346 B1 | * | 2/2004 | Halton et al. | 370/335 |
| 6,842,624 B2 | * | 1/2005 | Sarkar et al. | 455/522 |
| 6,873,847 B2 | * | 3/2005 | Shimono et al. | 455/441 |
| 6,993,337 B2 | * | 1/2006 | Rudrapatna et al. | 455/440 |
| 7,215,971 B2 | * | 5/2007 | Ormson | 455/502 |
| 7,299,010 B2 | * | 11/2007 | Lee et al. | 455/62 |
| 7,710,910 B2 | * | 5/2010 | Ode et al. | 370/323 |
| 7,944,808 B2 | * | 5/2011 | Yoon et al. | 370/208 |
| 8,200,264 B2 | * | 6/2012 | Kim et al. | 455/502 |
| 2002/0034967 A1 | * | 3/2002 | Taniguchi et al. | 455/562 |

(Continued)

FOREIGN PATENT DOCUMENTS

| | | |
|---|---|---|
| EP | 1424821 | 4/2009 |
| JP | 2010-532939 | 10/2010 |

(Continued)

OTHER PUBLICATIONS

Langley, Richard B., "The Mathematics of GPS," *GPS World*, vol. 2, No. 7, pp. 45-50, Jul./Aug. 1991.

(Continued)

*Primary Examiner* — Chi H Pham
*Assistant Examiner* — Robert Lopata
(74) *Attorney, Agent, or Firm* — Foley & Lardner LLP (57) ABSTRACT

A communications method includes establishing two or more access slot groups corresponding to velocity ranges of mobile units, receiving a signal from a mobile unit in an access slot of an access slot group, where the signal includes a sequence, and detecting the sequence using a detection algorithm, where the detection algorithm used is assigned to the access slot group.

20 Claims, 2 Drawing Sheets

(56) References Cited

U.S. PATENT DOCUMENTS

| | | |
|---|---|---|
| 2005/0036538 A1* | 2/2005 | Niederholz et al. .......... 375/148 |
| 2005/0060094 A1* | 3/2005 | Lee et al. ...................... 701/214 |
| 2007/0171808 A1* | 7/2007 | Wu et al. ....................... 370/208 |
| 2008/0198815 A1* | 8/2008 | Liu ................................ 370/336 |
| 2008/0267126 A1* | 10/2008 | Vujcic et al. .................. 370/330 |
| 2008/0267136 A1* | 10/2008 | Baker et al. ................... 370/336 |
| 2009/0067476 A1* | 3/2009 | Kawabata et al. ............. 375/133 |
| 2009/0086648 A1* | 4/2009 | Xu et al. ........................ 370/252 |
| 2009/0109908 A1* | 4/2009 | Bertrand et al. .............. 370/329 |
| 2009/0296563 A1* | 12/2009 | Kishiyama et al. ........... 370/210 |
| 2010/0150056 A1 | 6/2010 | Iwai et al. |
| 2010/0311424 A1* | 12/2010 | Oga ............................... 455/440 |

FOREIGN PATENT DOCUMENTS

| | | |
|---|---|---|
| WO | WO-00/42803 | 7/2000 |
| WO | WO-01/11823 | 2/2001 |
| WO | WO-2007/037414 | 4/2007 |

OTHER PUBLICATIONS

Zhang, Haining, "A Sample-Decimation Based Fast Preamble Detection Algorithm," A Thesis in the Department of Electrical and Computer Engineering, Concordia University (Canada), Mar. 2008.

U.S. Appl. No. 61/050,595, filed May 5, 2008, Sang G. Kim et al.

* cited by examiner

VELOCITY BASED RANDOM ACCESS SCHEME

BACKGROUND

In wireless communications systems, a slot based random access procedure may be used to initiate communications. In such systems, a pre-defined sequence such as a preamble can be transmitted in alignment with an access slot. The pre-defined sequence can be transmitted as part of a signal from a mobile unit. A base station or other network element can be configured to receive the signal from the mobile unit and detect the pre-defined sequence. The network element can be configured to coherently correlate the received signal and the pre-defined sequence over a sequence period using a detection algorithm.

SUMMARY

In one embodiment, a communications method includes establishing two or more access slot groups corresponding to velocity ranges of mobile units, receiving a signal from a mobile unit in an access slot of an access slot group, where the signal includes a sequence, and detecting the sequence using a detection algorithm, where the detection algorithm used is assigned to the access slot group.

In another embodiment, a network element includes a processor and a receiver operably coupled to the processor. The receiver is configured to receive a signal from a mobile unit, where the signal includes a sequence and where the signal is received in an access slot. The processor is configured to establish two or more access slot groups corresponding to velocity ranges of mobile units. The processor is also configured to detect the sequence using a detection algorithm, where the detection algorithm used corresponds to an access slot group, the access slot group associated with the access slot in which the signal was received.

In a further embodiment, a mobile unit includes a processor and a transmitter operably coupled to the processor. The processor is configured to determine a velocity of the mobile unit. The processor is also configured to identify an access slot group in which to transmit based at least in part on the velocity of the mobile unit. The transmitter is configured to transmit a signal to a network element in an access slot associated with the access slot group, where the signal includes a sequence.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

A mobile unit can act as a two-way radio in that the mobile unit sends signals to a network element and receives signals from the network element. The network element, which can be a base station, can have a microwave antenna to receive signals from the mobile unit and signals to be relayed to the mobile unit. The network element can also include a transmitter for forwarding signals to the mobile unit and for forwarding signals from the mobile unit to another network element for eventual provision to a second mobile unit or other recipient.

Some mobile units can be equipped with global positioning system (GPS) equipment for use in navigation and/or tracking of the mobile units. In a GPS-enabled mobile unit, the mobile unit can include a GPS receiver configured to receive signals from one or more satellites. The mobile unit can use the signals received from the satellites to determine a location of the mobile unit. The location of the mobile unit can be determined using triangulation or any of a variety of well-known techniques. A description of mathematical algorithms which may be used in a global positioning system can be found in an article titled "The Mathematics of GPS," by Richard Langley in the July/August 1991 edition of *GPS World*, the entire disclosure of which is incorporated herein by reference.

In a random access system adapting a slotted protocol, transmissions by a mobile unit can be made at the beginning of a discrete time slot to help reduce collisions. In the case of a stationary mobile unit, a network element may be able to coherently correlate a received signal over an entire sequence period to identify the mobile unit and perform other communication processes. As such, the network element can use a single detection algorithm for signals received from a stationary mobile unit. However, a mobile unit in motion (i.e., having a velocity) can cause channel variation, which may make it inefficient for the network element to perform a single coherent correlation over the entire sequence period. Further, in the case of a moving mobile unit, it may be beneficial for the network element to use one or more detection algorithms which are selected based on a measure of the velocity of the mobile unit. As such, described herein are illustrative methods, devices, systems, and computer-readable media for a random access scheme that is based on the velocity of the mobile unit.

Figure 1:
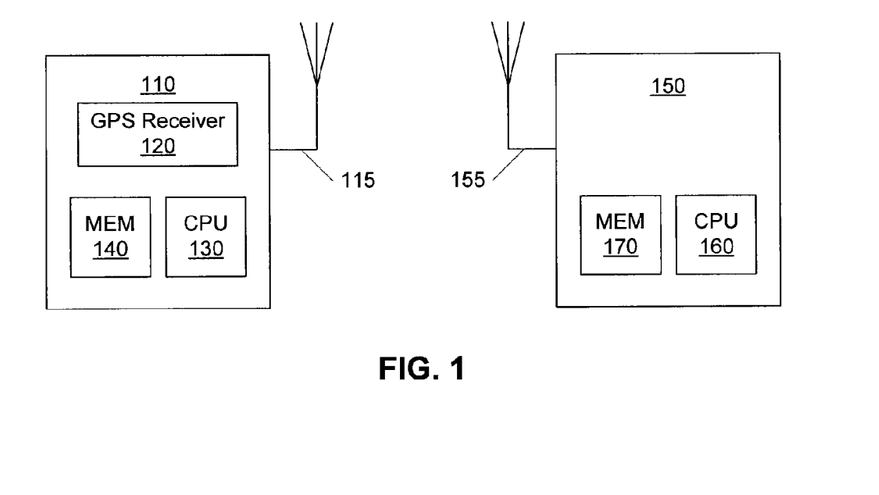
FIG. 1 is a block diagram of an illustrative embodiment of a mobile unit and a network element.

FIG. 1 is a block diagram of an illustrative embodiment of a mobile unit 110 and a network element 150. Network element 150 can be a base station, a base station controller, a mobile switching center, an access point, or any other network component which is configured to receive signals from and transmit signals to mobile unit 110. As depicted in FIG. 1, network element 150 includes an antenna 155, a central processing unit 160, and a memory 170. In alternative embodiments, network element 150 may include additional, fewer, and/or different components.

In an illustrative embodiment, a communication system including network element 150 and mobile unit 110 can adapt a random access scheme based on a slotted protocol to allow network element 150 to receive signals from mobile unit 110 or other mobile units and network elements. The slotted protocol can be a slotted ALOHA protocol or any other slotted protocol known to those of skill in the art. Hereinafter, it is assumed that the communication between network element 150 and mobile unit 110 is performed under the slotted ALOHA random access scheme. In a slotted ALOHA protocol, distinct time slots are generated and frames can be transmitted and received during the time slots. A node such as network element 150 can transmit a signal at the start of each time slot to inform other nodes such as mobile unit 110 when the time slot is available. Overlaps in transmission and collisions can be reduced through alignment of frames on the time slots.

In an illustrative embodiment, central processing unit 160 can execute instructions to utilize an appropriate detection algorithm based at least in part on the access slot in which a signal is received. For example, a first detection algorithm may be used if the signal is received in an access slot corresponding to a first access slot group, a second detection algorithm may be used if the signal is received in an access slot corresponding (or assigned) to a second access slot group, a third detection algorithm may be used if the signal is received in an access slot corresponding to a third access slot group, etc. Moreover, each access slot group can be associated with a velocity or velocity range. Access slot groups are described in more detail below with reference to FIGS. 2 and 4.

The detection algorithm can be used in part to identify a preamble or other pre-defined sequence in a received signal. For example, the preamble may be a request for call initiation or session initiation. The detection algorithm can be a sequence detection algorithm as known to those of skill in the art. The sequence detection algorithm can process signals based on a maximum correlation criterion. Alternatively, the detection algorithm may also be a sample-decimation based detection algorithm, a full search detection algorithm, a parallel-serial code phase detector algorithm, etc. Alternatively, any of a variety of other well-known detection algorithm(s) may be used. The detection algorithm can be selected to reduce the detection error rate for a particular access slot group.

Antenna 155, which can include a receiver and a transmitter, can be used to receive signals from and transmit signals to mobile unit 110. Memory (MEM) 170 may store one or more detection algorithms, access slot information as described below, and/or any other data associated with network element 150.

Mobile unit 110 includes a mobile unit antenna 115, a mobile unit central processing unit (CPU) 130, a mobile unit memory (MEM) 140, and a global positioning system (GPS) receiver 120. In alternative embodiments, mobile unit 110 may include additional, fewer, and/or different components. Mobile unit 110 can be any or any combination of a cellular telephone, a personal digital assistant (PDA), a portable gaming device, a pager, etc.

Global positioning system (GPS) receiver 120 receives GPS signals including information for use in determining a velocity of mobile unit 110. In an illustrative embodiment, the information can be received from one or more global positioning system satellites as known to those of skill in the art. Alternatively, the information can be received from any other source.

Mobile unit central processing unit (CPU) 130 can use the received information to determine the velocity of mobile unit 110 according to any of a variety of well-known methods. For example, in one embodiment, central processing unit (CPU) 130 of mobile unit 110 can use the received information to determine a location of mobile unit 110 using triangulation as known to those of skill in the art. As such, mobile unit 110 can determine a first location at a first time and a second location at a second time based on the received information. Using the determined location and time values, a magnitude of velocity (or speed) can be determined by dividing a distance between the first location and the second location by the elapsed time between the first time and the second time. Likewise, the first location and the second location can be used to determine a direction or bearing of mobile unit 110. In an alternative embodiment, any of a variety of well-known techniques known to those of skill in the art may be used to determine the velocity of mobile unit 110. Alternatively, the first location and the second location may be received via GPS receiver 120 or mobile unit antenna 115. In another alternative embodiment, additional locations, times, distances between locations, and/or any other information can be received by global positioning system (GPS) receiver 120 and/or mobile unit antenna 115. In one embodiment, the velocity may be determined externally and provided to mobile unit 110. The velocity, which may include a magnitude and/or a direction, can be stored in mobile unit memory (MEM) 140. Mobile unit 110 can also periodically determine the velocity and store the determined velocity in mobile unit memory (MEM) 140, and update the velocity such that the appropriate access slot group is used for all transmissions. By way of example, the update can be performed once every 0.1 seconds, once every 0.5 seconds, etc. Access slot groups are further discussed below.

In an alternative embodiment, mobile unit 110 may not include GPS receiver 120. In such an embodiment, mobile unit 110 may determine its velocity based on information received from one or more base stations or other network elements. For example, mobile unit 110 may determine the velocity using the directivity and timing of signals sent from one or more base stations or other network elements with known positions. Mobile unit 110 may also determine the velocity by triangulating a position based on Doppler shift measurements. Mobile unit 110 may also determine the velocity using velocity and/or acceleration sensors. Alternatively, the velocity may be determined by any of a variety of other well-known methods.

Mobile unit central processing unit (CPU) 130 can also be used to identify an access slot in which to transmit a signal to network element 150 based at least in part on the velocity. Mobile unit central processing unit 130 can identify the access slot based on access slot information which may be stored in mobile unit memory 140. The access slot information may be stored when manufacturing the mobile unit 110, or be broadcast from network element 150 periodically. In one embodiment, the access slot information can specify an access slot group corresponding to a velocity or velocity range. As an example, the access slot information can indicate that signals are to be transmitted in an access slot of a first access slot group if the velocity is less than (or equal to) a first velocity threshold, that the signals are to be transmitted in an access slot of a second access slot group if the velocity is greater than the first velocity threshold and less than (or equal to) a second velocity threshold, that the signals are to be transmitted in an access slot of a third access slot group if the velocity is greater than the second velocity threshold and less than (or equal to) a third velocity threshold, etc. The velocity thresholds can be static or dynamic, depending on the particular implementation. The access slot information and velocity thresholds are described in more detail below with reference to FIG. 2.

Figure 2:
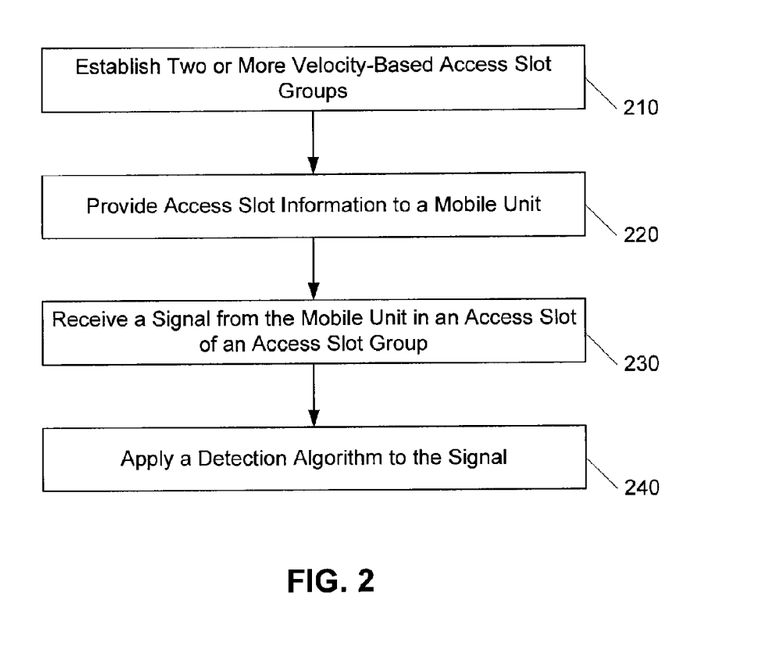
FIG. 2 is a flow diagram of an illustrative embodiment of a method for processing a received signal at a network element.

FIG. 2 is a flow diagram of an illustrative embodiment of a method for processing a received signal at network element 150. In an operation 210, two or more velocity-based access slot groups are established. Each access slot group can correspond to a velocity range and can include periodic access slots. In one embodiment, the access slot(s) belonging to each access slot group may be alternately and repetitively disposed with respect to one other. For example, assuming three access slot groups are used, the slot alignment may be as follows: a $1^{st}$ access slot (from a first access slot group and corresponding to a first velocity or velocity range), followed by a $2^{nd}$ access slot (from a second access slot group and corresponding to a second velocity or velocity range), followed by a $3^{rd}$ access slot (from a third access slot group and corresponding to a third velocity or velocity range), followed by a $4^{th}$ access slot (from the first access slot group), followed by a $5^{th}$ access slot (from the second access slot group), followed by a $6^{th}$ access slot (from the third access slot group), followed by a $7^{th}$ access slot (from the first access slot group), etc.

In one embodiment, the sequence of access slots can be weighted based on frequency of use, that is to say based on the number of mobile units having velocities within a certain velocity range. For example, there may be two access slot groups, with access slots from the first access slot group designated as '1' and access slots from the second access slot group designated as '2.' The first access slot group may be used to receive signals from mobile units that are traveling at less than 70 kilometers/hour (km/hr) and the second access slot group may be used to receive signals from mobile units that are traveling at greater than or equal to 70 km/hr. Stated differently, the first access slot group may be for use by mobile units to transmit signals when traveling at less than 70 km/hr and the second access slot group may be for use by mobile units to transmit signals when traveling at greater than or equal to 70 km/hr. It may be known that in a particular area, the majority of the vehicle traffic, and thus, the mobile units, travel faster than 70 km/hr. As such, the slot sequence may be 2, 2, 1, 2, 2, 1, 2, 2, 1, etc. Or the slot sequence may be 2, 2, 2, 1, 2, 2, 2, 1, 2, 2, 2, 1, etc. Alternatively, any other sequence weighted more favorably to '2' may be used.

The number of access slot groups can be based on one or more factors. For example, the number of access slot groups can be determined based at least in part on a length of the preamble or other sequence used by the communication system. As the length of the preamble or sequence used by the communication system increases, the number of access slot groups may be increased. Further, as channel variation becomes faster, or as Doppler frequency increases, the number of access slot groups may be increased. In one embodiment, two access slot groups may be used, one for receiving transmissions from low velocity mobile units and one for receiving transmissions from high velocity mobile units. In alternative embodiments, any number of access slot groups may be used.

Velocity threshold(s) can be velocity-based boundaries that define the access slot groups. The velocity threshold(s) used can be based on one or more factors. For example, the velocity threshold(s) for use in dividing the access slot groups can be based on an analysis of a detection error rate (DER) of signal(s) transmitted from one or more mobile units. The detection error rate (DER) that considers the channel variation due to a velocity change can be determined over an entire sequence and the result can be plotted in a graph in which the x-axis is the velocity of the mobile unit and the y-axis is the DER. The DER for divided intervals of the entire sequence can also be calculated and plotted on the graph. The velocity(s) at the intersection of the two plots can be used as the velocity threshold(s) for dividing the access slot groups. For example, in the case of a communication system using a 4096 chip preamble, the intersection velocity may be between 70 km/hr and 100 km/hr. In addition, other factors such as location of the mobile unit, direction of travel of the mobile unit, etc. can also be used to determine how to divide the access slot groups.

In one embodiment, the number of access slot groups and/or the velocity thresholds may be static values which do not vary based on time or other factors. Alternatively, the number of access slot groups and/or the velocity thresholds may vary based on one or more factors. For example, it may be known that individuals drive an average of 80 km/hr for the morning commute between the hours of 6:00 am and 9:00 am, and that individuals drive an average of 100 km/hr for the evening commute home between the hours of 5:00 pm and 8:00 pm. Using this information, the velocity thresholds and/or number of access slot groups can be adjusted accordingly based on the time of day. Similarly, it may be known that individuals drive slower in the winter than in the summer. Accordingly, the velocity thresholds and/or number of access slot groups can be adjusted based on the time of year. The velocity thresholds and/or number of access slot groups can also be based on the location of the mobile unit, the type of mobile unit, etc.

Referring again to FIG. 2, in an operation 220, access slot information is provided to a mobile unit. For example, the network element may transmit (e.g., broadcast) the access slot information for receipt by the mobile unit. Of course, one skilled in the art will appreciate that the transmitted access slot information may be received by other mobile units and network elements. The mobile unit can be mobile unit 110 or any other mobile unit. The access slot information can identify the access slot groups, the velocity threshold(s) separating the access slot groups, any time of day information regarding the access slot groups, any time of year information regarding the access slot groups, and/or any other information such that the mobile unit knows which access slot group to use for any given velocity at any given time. In one embodiment, the access slot information can be periodically provided to the mobile unit as an update. Alternatively, the mobile unit may receive the access slot information one time. In other embodiments, the access slot information may not be provided to the mobile unit from the network element. In such embodiments, the access slot information may be installed on the mobile unit by a mobile unit manufacturer, received from a cellular provider, downloaded from a wired or wireless network, or received by the mobile unit from any other source.

In an operation 230, the network element receives a signal from the mobile unit in an access slot of an access slot group. The signal can be a preamble or other predefined sequence used to initiate a communication session. As described in more detail below with reference to FIG. 3, the access slot in which the signal is received can be selected based on a velocity of the mobile unit.

In an operation 240, the network element applies a detection algorithm to the signal. In an illustrative embodiment, the detection algorithm can be specific to the access slot group in which the signal is received. For example, if the signal is received in an access slot of a first access slot group, a first detection algorithm corresponding to the first access slot group can be used. Similarly, if the signal is received in an access slot of a second access slot group, a second detection algorithm corresponding to the second access slot group can be used.

As an example, the network element may utilize two access slot groups. A first access slot group can be used to receive transmissions from mobile units having a velocity of less than 100 km/hr, and the second access slot group can be used to receive transmissions from mobile units having a velocity of greater than (or equal to) 100 km/hr. In one embodiment, a parallel-serial code phase detection algorithm can be used to detect signals received in the first access slot group and a full search detection algorithm can be used to detect signals received in the second access slot group. In this instance, if the velocity of a mobile unit is 60 km/hr, the mobile unit can transmit a signal in the first access slot group. As such, the network element can apply the parallel-serial code phase detection algorithm to the received signal. In alternative embodiments, any other detection algorithms may be associated with the first access slot group and/or the second access slot group.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 3:
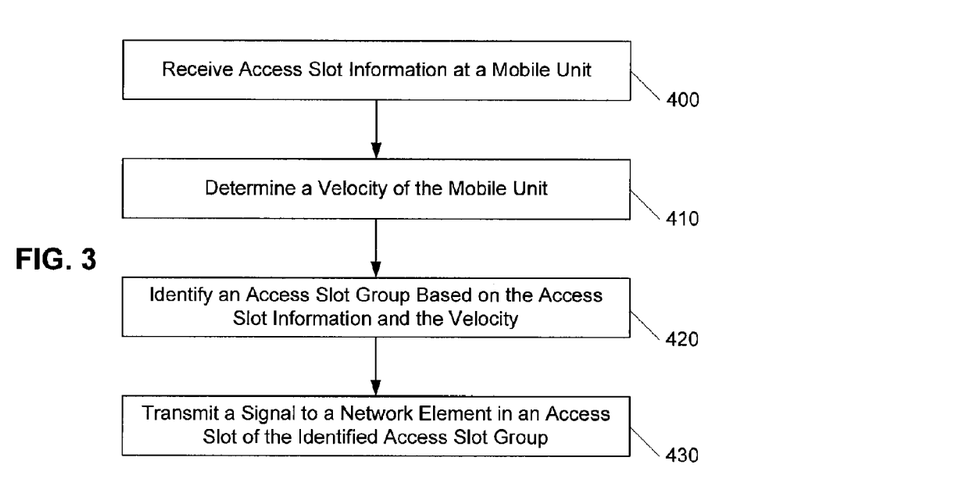
FIG. 3 is a flow diagram of an illustrative embodiment of a method for transmitting a signal by a mobile unit.

FIG. 3 is a flow diagram of an illustrative embodiment of a method for transmitting a signal by a mobile unit. In an operation 400, access slot information is received at the mobile unit. The mobile unit can be mobile unit 110 or any other mobile unit. The access slot information can set forth which access slot group is to be used by the mobile unit based on one or more factors such as, by way of example, the velocity of the mobile unit, the time of day, the time of year, etc. The access slot information can be received from a network element, through a download, through an update, or from any other source. In one embodiment, the access slot information may be installed or stored on the mobile unit by the mobile unit manufacturer. The access slot information can also include information regarding the periodic sequence of access slots. The access slot information can be stored in a memory of the mobile unit.

In an operation 410, the mobile unit determines its velocity. The velocity can include a speed of the mobile unit and/or a bearing of the mobile unit. For example, the velocity may indicate that the mobile unit is moving at a speed of 50 km/hr (kilometers per hour) at a bearing of 240 degrees. In an illustrative embodiment, the velocity can be determined using a GPS receiver and GPS technology as described with reference to FIG. 1. The mobile unit may periodically determine the velocity and update the determined velocity in the memory unit by storing the periodically determined velocity, such that the appropriate access slot group is used for all transmissions. When the mobile unit wants to establish a communication session with the network element (e.g., the mobile unit wants to initiate a transmission in response to a command, prompt, action, etc. by a user of the mobile unit), the mobile unit can determine its velocity at that instance in time or retrieve a previously stored and updated velocity from the memory unit. Alternatively, the velocity may be received from an outside source that is tracking the mobile unit, or determined in the mobile unit using any other methods known to those of skill in the art. The mobile unit may also update the velocity such that the appropriate access slot group is used for all transmissions. The mobile unit may perform the updates periodically, at random times, according to a schedule, based on predetermined conditions, etc.

In an operation 420, the mobile unit identifies an access slot group based at least in part on the access slot information and at least in part on the velocity. The mobile unit may identify an access slot group in response to a determination of a need to transmit a signal. As an example, there may be three access slot groups. Based on the access slot information, the mobile unit can determine that the first access slot group corresponds to a velocity range from 0 km/hr to 60 km/hr. If the velocity determined or retrieved from the memory by the mobile unit is 42 km/hr, the mobile unit identifies the first access slot group as the appropriate access slot group to transmit within. Alternatively, the access slot information may indicate that the first access slot group is to be used for velocities in the range of 0 km/hr to 80 km/hr between the hours of 9:00 pm and 6:00 am, and for velocities in the range of 0 km/hr to 60 km/hr between the hours of 6:00 am and 9:00 pm. The second access slot group may be used for velocities in the range of 81 km/hr to 120 km/hr between the hours of 9:00 pm and 6:00 am, and for velocities in the range of 61 km/hr to 105 km/hr between the hours of 6:00 am and 9:00 pm. As such, if the velocity of the mobile unit is 70 km/hr at 10:00 pm, the mobile unit can identify the first access slot group as the appropriate access slot group. If the velocity is 70 km/hr at 4:00 pm, the mobile unit can identify the second access slot group as the appropriate access slot group.

In an operation 430, the mobile unit transmits a signal, for example to the network element in an access slot of the identified access slot group. The signal can include a preamble or other predefined sequence for use in establishing a communication session. The signal can be transmitted by the mobile unit in the appropriate slot by any method known to those of skill in the art. For example, the mobile unit can acquire the timing of the network element, use the timing of the network element to identify the beginning of an appropriate slot, and transmit the signal at the beginning of the identified slot.

Figure 4:
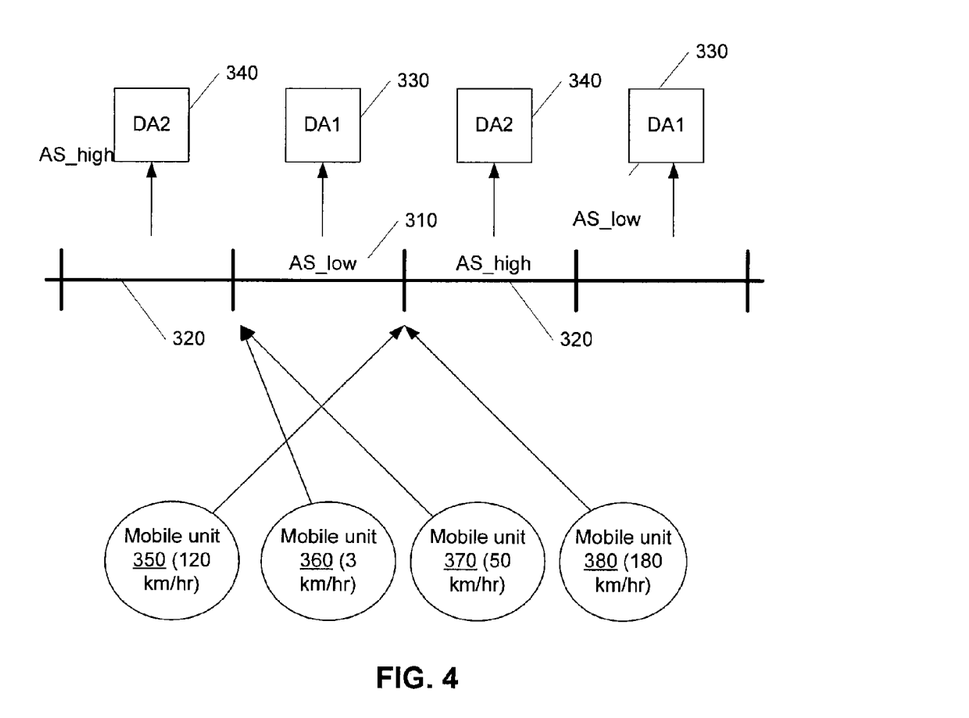
FIG. 4 shows an illustrative embodiment of an implementation of access slots of a communication system.

FIG. 4 shows an illustrative embodiment of an implementation of access slots of a communication system. In this embodiment, the communication system including mobile units 350-380 and a network element (not shown) may adapt a code division multiple access (CDMA) scheme based on the slotted ALOHA, which uses a 4096 chip preamble. The uplink access slots may be divided into two access slot groups as shown in FIG. 4, and the velocity threshold for dividing the access slot groups may be 100 km/hr. A low access slot group composed of access slots 310 designated as "AS_low" is assigned to mobile units having a velocity of less than 100 km/h. A high access slot group composed of access slots 320 designated as "AS_high" is assigned to mobile units having a velocity greater than or equal to 100 km/hr. In the access slot sequence illustrated in FIG. 4, one AS_high access slot 320 and one AS_low access slot 310 are alternately disposed with each other repeatedly. In alternative embodiments, any other number of access slot groups and/or values of velocity thresholds may be used.

At the network element, a low detection algorithm 330 designated as "DA1" is used to detect signals received in low access slot 310 and a high detection algorithm 340 designated as "DA2" is used to detect signals received in high access slot 320. In one embodiment, low detection algorithm 330 can be a detection algorithm in which coherent correlation between the received signal from a mobile unit and the predefined sequence stored in the network element is performed over the entire sequence. High detection algorithm 340 can be a detection algorithm in which coherent correlation is respectively performed on each of a multiple number of short sequences of the entire sequence. Correlation values of the multiple numbers of short sequences can be non-coherently combined. In alternative embodiments, any other detection algorithms may be used for low detection algorithm 330 and/or high detection algorithm 340.

In the illustrative embodiment depicted in FIG. 4, mobile unit 350 may be moving at a velocity of 120 km/hr, mobile unit 360 may be moving at a velocity of 3 km/hr, mobile unit 370 may be moving at a velocity of 50 km/hr, and mobile unit 380 may be moving at a velocity of 180 km/hr. If a user of mobile unit 350 attempts to place a call, mobile unit 350 can identify the high access slot group which is assigned to the velocity range that includes the current velocity of mobile unit 350. Then, mobile unit 350 may detect a start time of a slot, for example, the second depicted high access slot 320 in the high access slot group and send a preamble to the network element at the detected start time. Then, the network element receiving the preamble transmitted from mobile unit 350 can use high detection algorithm 340 to detect the preamble, and a communication session can be established with mobile unit 350 by use of any of a variety of well-known communication session establishment techniques. In one embodiment, mobile unit 350 can receive an acknowledgement message from the network element. If the acknowledgement message from the network element is not received due to, for example, the collision of signals, etc., mobile unit 350 can retransmit the preamble during a subsequent high access slot 320.

Similarly, if a user of mobile unit 360 attempts to place a call, mobile unit 360 can detect a start time of a slot, for example, the first depicted low access slot 310 in the low access slot group and send a preamble to the network element at the detected start time. The network element can use low detection algorithm 330 to detect the preamble, and a communication session can be established with mobile unit 360 by use of any of a variety of well-known communication session establishment techniques. In one embodiment, mobile unit 360 can receive an acknowledgement message from the network element. If mobile unit 360 fails to receive the acknowledgement for any reason, mobile unit 360 can retransmit the preamble during any one of the subsequent low access slots 310 of the low access slot group. Mobile unit 370 and mobile unit 380 can operate in a similar fashion to mobile unit 360 and mobile unit 350, respectively.

A random access system based on the velocity information of a mobile unit can be used to reduce the collision of signals and to reduce detection errors during call initiation. Additionally, use of such a system increases the computational efficiency of the network element. The systems described herein can be used with a Universal Mobile Telecommunications System (UMTS) network, a Wideband Code Division Multiple Access (W-CDMA) network, a Time Division-Code Division Multiple Access (TD-SCDMA) network, a Time Division-Synchronous Code Division Multiple Access (TD-SCDMA) network, etc. Additionally, the systems described herein can also be applied to satellite communications systems, radio-frequency identification (RFID) systems, radio-based tolling systems, vehicle tracking systems, mobile IEEE 802.11-type systems, etc.

In an illustrative embodiment, any of the operations, processes, etc. described herein can be implemented as computer-readable instructions stored on a computer-readable medium. The computer-readable instructions can be executed by a processor of a mobile unit, a network element, and/or any other computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A communications method comprising:
   establishing an access slot group corresponding to a velocity range of one or more mobile units relative to a network element;
   establishing a slot sequence for the access slot group, wherein the slot sequence is weighted based on a frequency of use of the one or more mobile units;
   transmitting the access slot group information to one or more mobile units, wherein the access slot group information indicates a start time for an access slot and the slot sequence;
   receiving a signal at the network element from at least one of the one or more mobile units in the access slot of the access slot group at the indicated start time for the access slot, wherein the signal includes a sequence of bits, wherein the at least one of the one or more mobile units selects the access slot of the access slot group;
   selecting a detection algorithm corresponding to the velocity range of the at least one of the one or the one or more mobile units relative to the network element; and
   detecting the sequence of bits using the detection algorithm, wherein the detection algorithm performs a coherent correlation between the received signal and a predefined sequence stored in the network element.

2. The method of claim 1, wherein
   the at least of the one or the one or more mobile units is a first mobile unit,
   the access slot group is a first access slot group,
   the access slot is a first access slot, and
   further comprising establishing a second access slot group corresponding to a second velocity range of the second mobile unit.

3. The method of claim 2, further comprising establishing a velocity threshold as a boundary between the first velocity range and the second velocity range.

4. The method of claim 3, wherein the velocity threshold varies based at least in part on a time of day.

5. The method of claim 3, wherein the velocity threshold varies based at least in part on a time of year.

6. The method of claim 2, further comprising determining the slot sequence for the first access slot group and the second access slot group.

7. The method of claim 6, wherein the slot sequence is weighted based on a frequency of use, such that first access slots from the first access slot group occur more frequently than second access slots from the second access slot group.

8. The method of claim 3, wherein the velocity threshold is established based at least in part on an analysis of a detection error rate of one or more received signals.

9. The method of claim 1, further comprising determining a number of access slot groups based at least in part on a length of the sequence of bits.

10. A network element comprising:
a transmitter configured to transmit access group information to one or more mobile units, wherein the access group information indicates a start time for an access slot;
a receiver configured to receive a signal from a mobile unit at the indicated start time for the access slot, wherein the signal includes a sequence of bits; and
a processor operably coupled to the receiver and configured to:
establish an access slot group corresponding to a velocity range of the mobile unit relative to the network element;
establish a slot sequence for the access slot group, wherein the slot sequence is weighted based on a frequency of use of the one or more mobile units;
select a detection algorithm corresponding to the velocity range of the mobile unit relative to the network element; and
detect the sequence of bits using the detection algorithm, wherein the detection algorithm performs a coherent correlation between the received signal and a predefined sequence stored in the network element.

11. The network element of claim 10, wherein the sequence of bits comprises a preamble.

12. The network element of claim 10, further comprising a transmitter operably coupled to the processor and configured to transmit an acknowledgement message to the mobile unit upon detection of the sequence of bits.

13. The network element of claim 10, wherein the access slot group is a first access slot group and the processor is further configured to establish a second access slot group corresponding to a second velocity range.

14. The network element of claim 13, wherein the velocity range is a first velocity range and the processor is further configured to establish a velocity threshold as a boundary between the velocity range and the second velocity range.

15. A mobile unit comprising:
a processor configured to
determine a velocity of the mobile unit relative to a network element; and
identify an access slot group in which to transmit based at least in part on the velocity of the mobile unit;
identify a slot sequence for the access slot group, wherein the slot sequence is weighted based on a frequency of use of one or more mobile units;
a transmitter operably coupled to the processor and configured to receive access slot group information from the network element, wherein the access slot group information indicates a start time for an access slot and the slot sequence; and configured to transmit a signal to the network element in the access slot associated with the access slot group at the indicated start time for the access slot, wherein the signal includes a sequence of bits; and
a receiver configured to receive an acknowledgement message from the network element, wherein the acknowledgement message is transmitted upon detection of the sequence of bits by the network element, wherein the sequence of bits is detected using a detection algorithm based at least in part on performing a coherent correlation between the received signal and a predefined sequence stored in the network element.

16. The mobile unit of claim 15, further comprising a global positioning system receiver operably coupled to the processor and configured to receive information for use in determining the velocity of the mobile unit.

17. The mobile unit of claim 15, wherein the access slot group is identified based at least in part on access slot information.

18. The mobile unit of claim 15, wherein the acknowledgement message is received upon detection of the sequence of bits by the network element, wherein the sequence of bits is detected using a detection algorithm based at least in part on the identified access slot group.

19. The mobile unit of claim 15, wherein the processor is further configured to periodically update the velocity and the identification of the access slot group.

20. The mobile unit of claim 15, wherein the processor is further configured to periodically update the velocity and information regarding the access slot group.

* * * * *

UNITED STATES PATENT AND TRADEMARK OFFICE
CERTIFICATE OF CORRECTION

PATENT NO. : 8,913,563 B2
APPLICATION NO. : 12/366800
DATED : December 16, 2014
INVENTOR(S) : Joo Page 1 of 1

It is certified that error appears in the above-identified patent and that said Letters Patent is hereby corrected as shown below:

In the Specification

In Column 3, Line 44, delete "Memory (MEM)" and insert -- Memory --, therefor.

In Column 9, Line 47, delete "(TD-SCDMA)" and insert -- (TD-CDMA) --, therefor.

In Column 10, Line 33, delete "and or" and insert -- and/or --, therefor.

In the Claims

In Column 12, Line 49, in Claim 2, delete "least of" and insert -- least one of --, therefor.

Signed and Sealed this
Second Day of June, 2015

Michelle K. Lee
*Director of the United States Patent and Trademark Office*